United States Patent [19]

Whitehead

[11] Patent Number: 4,787,708

[45] Date of Patent: Nov. 29, 1988

[54] APPARATUS FOR CONTINUOUSLY CONTROLLED EMISSION OF LIGHT FROM PRISM LIGHT GUIDE

[75] Inventor: Lorne A. Whitehead, Vancouver, Canada

[73] Assignee: TIR Systems Ltd., Burnaby, Canada

[21] Appl. No.: 47,661

[22] Filed: May 8, 1987

[51] Int. Cl.⁴ .............................................. G02B 6/00
[52] U.S. Cl. .............................. 350/96.28; 350/96.10; 350/259
[58] Field of Search ............... 350/96.10, 96.28, 96.29, 350/96.30, 96.32, 102, 103, 259, 262, 265, 286

[56] References Cited

U.S. PATENT DOCUMENTS

| | | | |
|---|---|---|---|
| 3,829,675 | 8/1974 | Mariani | 350/96.10 |
| 4,105,293 | 8/1978 | Aizenberg et al. | 350/264 |
| 4,260,220 | 4/1981 | Whitehead | 350/96.28 |
| 4,459,642 | 7/1984 | Mori | 350/96.10 |
| 4,615,579 | 10/1986 | Whitehead | 350/96.10 |

FOREIGN PATENT DOCUMENTS

| | | |
|---|---|---|
| 77726 | 11/1981 | Austria . |
| 2237820 | 2/1974 | Fed. Rep. of Germany . |
| 2112166 | 7/1983 | United Kingdom . |

OTHER PUBLICATIONS

Pearson, "Piping Light with Acyrilic Materials", Modern Plastics pp. 123–127; Aug. 1946.

Primary Examiner—John D. Lee
Assistant Examiner—Phan Heartney
Attorney, Agent, or Firm—Christie, Parker & Hale

[57] ABSTRACT

A variety of techniques are used to effect continuously controlled emission of light from a light guide. For example, the light guide may contain a mechanism formed of a substantially non-light absorptive material having a density which varies as a function of the length of the light guide. The mechansim causes light to escape from the light guide at a rate which varies along the length of the light guide, such that the amount of light escaping, per unit length, along the light guide has a selected distribution of values. Alternatively, the light guide's central path may be non-linear. As a further alternative, the average cross-sectional dimension of each of the plane segments aforesaid may be non-constant. As yet another alternative, a first portion of the light guide may comprise prism light guide material and the remaining portion may be such that a substantial portion of light incident thereupon is allowed to escape therethrough.

46 Claims, 1 Drawing Sheet

APPARATUS FOR CONTINUOUSLY CONTROLLED EMISSION OF LIGHT FROM PRISM LIGHT GUIDE

FIELD OF THE INVENTION

This application pertains to apparatus for continuously controlling the emission of light from a Prism Light Guide as generally described and illustrated in U.S. Pat. No. 4,260,220 issued Apr. 7, 1981 for an invention of Lorne A. Whitehead.

BACKGROUND OF THE INVENTION

The aforementioned United States patent describes and illustrates a Prism Light Guide for transmitting or "piping" light from a central source to a remote location or locations. As used herein the term "light guide" means a light guide as described and claimed in the aforementioned United States patent. More particularly, the term "light guide" as used herein means a hollow structure comprised of sections having inner and outer surfaces which are in "octature" in that, over regions of each section which are not large relative to the thickness of the walls of the light guide in such regions, each section satisfies all of the following conditions:

1. All of the inner surfaces of each section are either perpendicular or parallel to one another;
2. All of the outer surfaces of each section are either perpendicular or parallel to one another; and,
3. Each of the inner surfaces is at a 45° angle to each of the outer surfaces.

As explained in the aforementioned patent, light may be constrained to travel through such a light guide without escaping through the walls of the guide if the angle by which the light rays deviate from the longitudinal axis vector of the guide does not exceed a maximum angle which depends upon the refractive index of the light guide material and which can be shown to be 27.6° for light guide material such as acrylic plastic having a refractive index of 1.5.

In many applications it is desirable that light escape from the light guide in a continuously controllable manner. In particular, it is often desirable that light escape from the guide at a rate which varies along the length of the guide, such that the amount of light escaping per unit length along the guide has a selected distribution of values. In many situations it will be desirable that the amount of light escaping, per unit length, from the guide is substantially constant along the length of the guide so as to provide uniform illumination along the guide. In other situations it may be desirable to vary the amount of light escaping, per unit length, from the guide in order to provide a gradient distribution of light illumination.

Broadly speaking, there are seven mechanisms which may cause light to escape from a light guide:

1. Angular imperfection of the prism light guide material used to construct the light guide.
2. Light scattering phenomena caused by the physical characteristics of the particular prism light guide material used to construct the light guide.
3. Deformation or destruction of the prisms which make up the prism light guide material.
4. Removal of prism light guide material from a portion of the light guide.
5. Non-linearity of the central path of the light guide.
6. Variability of the cross-section of the light guide.
7. Placement of substantially non-light absorptive materials within the light guide.

The first two mechanisms are intrinsic characteristics of the prism light guide material used to form the light guide and therefore are not subject to control in the manner contemplated by this application. The remaining five characteristics may however be controlled, either singly, or in combination with one another, to cause light to escape from the light guide at a rate which varies along the length of the light guide, such that the amount of light escaping, per unit length, along the light guide has a selected distribution of values.

SUMMARY OF THE INVENTION

The invention is directed to a light guide having the following general characteristics:

(i) A central path defined as the locus of points which are the centroids of the segments contained within the light guide of all planes which intersect the light guide and which are oriented such that the area of each plane segment is a minimum;

(ii) An average cross-sectional dimension defined, for each one of the plane segments aforesaid, as the average length of those portions of all lines within the light guide which lie on said one plane segment and which intersect the light guide;

(iii) The length of the light guide is substantially greater than the average cross-sectional dimension of substantially all of the plane segments aforesaid;

(iv) The fractional rate of change, along the light guide, of substantially all randomly selected cross-sectional dimensions of the light guide, is substantially less than the reciprocal of the average cross-sectional dimension of substantially all of the plane segments aforesaid; and, (v) The radius of curvature of the light guide central path at substantially all randomly selected points on the central path is substantially greater than the average cross-sectional dimension of substantially all of the plane segments aforesaid.

In a first preferred embodiment, a light guide as characterized above contains a mechanism which causes light to escape from the light guide at a rate which varies along the length of the light guide, such that the amount of light escaping, per unit length, along the light guide has a selected distribution of values. Preferably, the mechanism is a substantially non-light absorptive material whose density varies as a function of the length of the light guide.

In a second embodiment, a light guide as characterized above has a non-linear central path. Preferably, the non-linearity is such that light escapes from the light guide at a rate which varies as a function of the length of the light guide. Advantageously, the amount of light escaping, per unit length, from the light guide is substantially constant along the length of the light guide.

In a third embodiment, the invention provides a light guide characterized as above wherein the average cross-sectional dimension of each of the plane segments aforesaid is non-constant. Preferably, the average cross-sectional dimension of each of the plane segments aforesaid varies such that light escapes from the light guide at a rate which varies as a function of the length of the light guide. Here again, the amount of light escaping, per unit length, from the light guide is advantageously substantially constant along the length of the light guide.

In a fourth embodiment, the invention provides a light guide as characterized above in which a first portion of the light guide comprises prism light guide material and the remaining portion of the light guide allows a substantial portion of light incident thereupon to escape therethrough. The ratio of the first and remaining portions may vary, along the light guide, such that a substantially constant amount of light escapes through the remaining portion at all points along the light guide. The remaining portion may be formed by removing a selected amount of prism light guide material from a selected portion of the light guide. Alternatively, the remaining portion may be formed by altering the optical characteristics of a selected part of the prism light guide material initially forming part of the first portion to prevent specular total internal reflection of light within the light guide from occurring at the selected part. As another alternative, the remaining portion may be formed by placing in optical contact with a selected part of the prism light guide material initially forming part of the first portion, a substance which prevents specular total internal reflection of light within the light guide from occurring as it would if said substance were not present.

In any embodiment, the invention may further comprise an external cover over at least a portion of the light guide, whereby a portion of the light which escapes from the light guide is transmitted through the cover and away from the light guide; and, the remaining portion of the escaping light is reflected by the cover back into the light guide.

DETAILED DESCRIPTION OF THE PREFERRED EMBODIMENTS

Figure 1:
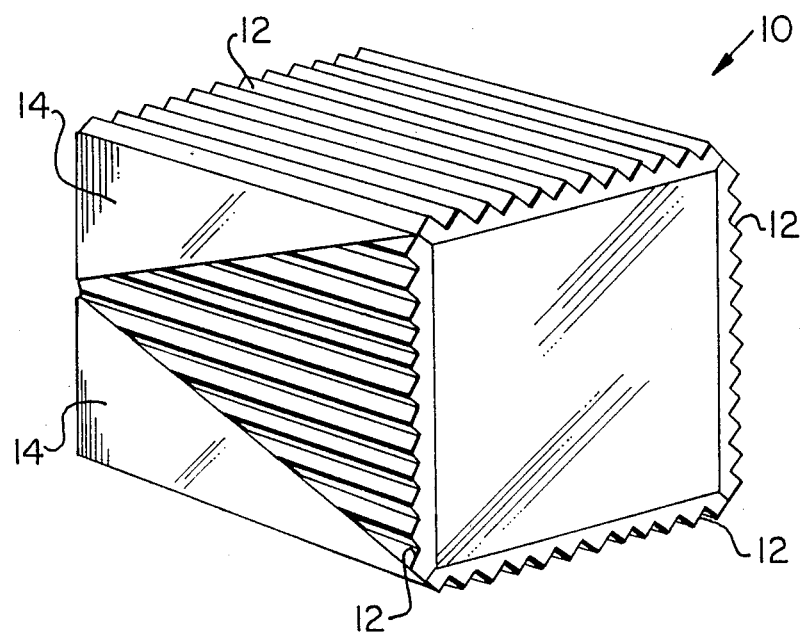
FIG. 1 is a pictorial representation of a light guide section in accordance with one embodiment of the invention.

Although FIG. 1 depicts a light guide section 10 of rectangular cross-section, those skilled in the art will appreciate that light guides of arbitrary cross-section may be constructed. It is convenient to define the "central path" of a light guide as the locus of points which are the centroids of the segments contained within the light guide of all planes which intersect the light guide and which are oriented such that the area of each of the plane segments is a minimum. For example, if the light guide happens to be cylindrical, then it will be circular in cross-section and its central path will be the longitudinal axis of the cylinder; because the segments contained within the light guide of all planes which intersect the light guide and which are oriented such that the area of each of the plane segments is a minimum are circles and the centroids of those circles are their respective centres which together comprise a locus of points which defines the longitudinal axis of the cylinder. It is also convenient to define an "average cross-sectional dimension" comprising, for each one of the plane segments aforesaid, the average length of those portions of all lines within the light guide which lie on the one plane segment and which intersect the light guide. Again taking the example of a cylindrical light guide, the average cross-sectional dimension will be somewhat less than the diameter of the minimum area circular plane segments aforesaid.

Several criteria must be satisfied in order to construct a useful light guide. In particular, the length of the light guide should be substantially greater than the average cross-sectional dimension of substantially all of the notional plane segments aforesaid so that light can be guided over a useful distance. The fractional rate of change, along the light guide, of substantially all randomly selected cross-sectional dimensions of the light guide, should be substantially less than the reciprocal of the average cross-sectional dimension of substantially all of the notional plane segments aforesaid. Otherwise, very substantial amounts of light may escape from the guide in circumstances which afford little or no opportunity for control of such escapement. For the same reason, the radius of curvature of the light guide's central path at substantially all randomly selected points on the central path should be substantially greater than the average cross-sectional dimension of substantially all of the notional plane segments aforesaid.

The term "substantially" is used frequently herein because there is a wide range of light guides which will allow some light to escape through their walls, and yet still retain useful light guiding properties, in that useful amounts of light are guided along the entire, or substantially the entire length of the guide. For example, the radius of curvature of the light guide's central path would normally be about twenty times the average cross-sectional dimension of substantially all of the notional plane segments aforesaid. If the radius of curvature equalled the average cross-sectional dimension aforesaid, then substantial amounts of light would escape from the guide in circumstances affording little or no opportunity for control of such escapement. If the radius of curvature were, say, three times the average cross-sectional dimension aforesaid, then significant amounts of light would still escape from the guide, but some amount of light would remain within and be guided to the end of the guide. Accordingly, such a guide, while far from ideal, nevertheless falls within the scope of the claims appended hereto. Experimentation is required to determine how a particular factor, or combination of factors, will affect the escape of light from a particular light guide.

As explained above, a light guide having the general characteristics aforesaid may be constructed such that light is constrained to travel through the light guide without escaping through the walls of the guide. Invariably, a small amount of light always escapes through the walls of the guide, due to the physical impossibility of constructing "perfect" prisms and due to inherent light scattering properties of the prism light guide material used to construct the light guide (suitable prism light guide material is sold under the trade mark SCOTCH-CAL by 3M Company of St. Paul, Mn.). The intrinsic properties aforesaid are essentially non-controllable. Their effects may be minimized but never entirely eliminated. Accordingly, this application focuses on other controllable mechanisms for causing light to escape from a light guide.

FIG. 1 depicts one way of causing light to escape from a light guide; namely, construction of the light guide in separate portions. More particularly, as depicted in FIG. 1, a first portion of light guide 10 may comprise prism light guide material 12 and the remaining portion 14 may be configured such that a substantial portion of light incident thereupon (from inside the light guide) escapes therethrough. Remaining portion 14 may for example be formed by cutting away or otherwise removing a selected amount of prism light guide material 12 from a selected portion of light guide 10.

Alternatively, remaining portion 14 may be formed by altering the optical characteristics of a selected part of the prism light guide material 12 which initially forms part of light guide 10 so as to prevent specular total internal reflection of light within light guide 10 from occurring at the selected part aforesaid. The alteration may for example be accomplished by sanding, grinding or abrading prism light guide material 12 to deform or destroy the prisms thereon. As another alternative, remaining portion 14 may be formed by placing in optical contact with a selected part of the prism light guide material which initially forms part of light guide 10, a substance which prevents specular total internal reflection of light within light guide 10 from occurring, as it would if said substance were not present. For example, liquid acrylic may be sprayed or painted on the prismatic surface of prism light guide material 12 to leave a smooth, rather than a prismatic, outer surface on material 12 over the selected part aforesaid.

As depicted in FIG. 1, a portion of the prism light guide material 12 on one of the four walls of rectangular light guide 10 has been removed so that remaining portion 14 is simply left open, thereby allowing light to escape through that wall of light guide 10. It will however be noted that the ratio of prism light guide material 12 to remaining portion 14 varies, along the length of light guide 10. In this example, it is assumed that the light source which illuminates the interior region of light guide 10 is placed at the right hand end of light guide 10 as viewed in FIG. 1. A light reflecting mirror is placed at the opposite end of light guide 10 (or, alternatively, light guide 10 may be made twice as long and a second, identical light source placed at its opposed end). As may be seen in FIG. 1, remaining portion 14 diminishes to nothing at the end of light guide 10 where the light source is situate. The area covered by remaining portion 14 gradually increases along the length of light guide 10, away from the end of the light guide at which the light source is situate. Similarly, there is a corresponding decrease in the amount of prism light guide material 12 on the light guide wall in question. Thus, comparatively little light escapes through remaining portion 14 at the end of light guide 10 near the light source; and an ever increasing amount of light escapes through remaining portion 14 along the length of the guide as the area occupied by remaining portion 14 increases. By experimentation, one may configure remaining portion 14 so that the amount of light escaping, per unit length, along light guide 10 has a selected distribution of values. For example, it will often be desirable to configure remaining portion 14 so that a constant amount of light escapes through remaining portion 14 at all points along light guide 10.

The escape of light from a light guide may be analyzed along the intersection, with the guide, of a plane which is perpendicular to the light guide's central path at a point "z" on the central path. Let $\phi_1$ be the luminous flux of light which travels along the guide in a first direction, and let $\phi_2$ be the luminous flux of light which travels along the guide in the opposite direction. Also, let $E_1$ be the rate at which light travelling in the first direction escapes from the guide, and let $E_2$ be the rate at which light travelling in the opposite direction escapes from the guide. Accordingly, the luminous flux $I(z)$ of the light which escapes from the guide at the intersection aforesaid is given by:

$$I(z) = E_1(z)\phi_1(z) + E_2(z)\phi_2(z)$$

Because light which has escaped from the guide no longer travels along the guide, it is apparent that the rates of change of $\phi_1$ and $\phi_2$ are:

$$d\phi_1(z)/dz = -\phi_1(z)E_1(z);$$
and, $$d\phi_2(z)/dz = \phi_2(z)E_2(z)$$

where the difference in sign indicates the two directions light travels through the guide.

The foregoing equations can be solved if the conditions prevailing at the ends of the guide are known, as they usually are: a light source typically establishes the conditions at one end of the guide and a mirror (or another light source) typically establishes the conditions at the opposite end. It will be apparent to those skilled in the art that, by selecting a given set of values for $E_1$ and $E_2$ (which are usually equal, unless some optical asymmetry is involved) one may predict the values obtainable for $\phi_1$ and $\phi_2$ and hence I. Accordingly, if a selected value of $I(z)$ is desired at a particular point along the guide, then one may by experimentation or by computer simulation vary $E_1$ and $E_2$ to determine the values required to yield the selected value of $I(z)$. Practical constraints are dictated by the fact that intrinsic losses caused by the light guide material establish a minimum attainable value of $I(z)$. A maximum attainable value of $I(z)$ is set by the light escapement technique employed. For example, if light guide material 12 is completely removed then no greater amount of light can be made to escape from the light guide without increasing the amount of light input by the light source. A further design factor to be taken into account is the desirability of minimizing the amount of light returned to the light source after reflection from the opposite end of the guide.

As an alternative, (or in addition to) to the technique explained above with reference to FIG. 1, one may configure light guide 10 to contain a mechanism which causes light to escape from the light guide at a rate which varies along the length of the light guide, such that the amount of light escaping, per unit length, along the light guide has a selected distribution of values. The mechanism in question is preferably a substantially non-light absorptive material such as a transparent plastic. Just as the area occupied by remaining portion 14 may be varied along the length of light guide 10 to attain a desired light distribution along the length of the guide, so the density of the material disposed in side guide 10 may vary, as a function of the length of the guide, in a controllable manner proportional to the amount of light which is allowed to escape from the guide.

Other techniques for effecting continuously controllable light escapement from the guide include the construction of a light guide having a non-linear central path; and/or the construction of a light guide in which the average cross-sectional dimension of the segments contained within the light guide of all planes which intersect the light guide and which are oriented such that the area of each plane segment is a minimum, is non-constant. In the case of a light guide having a non-linear central path, the non-linearity is preferably such that light escapes from the guide at a rate which varies as a function of the length of the light guide. The central path non-linearity required, in a particular light guide, to attain a desired uniform or a desired gradient of light escapement from the guide may be determined experimentally. Similarly, in the case of non-constant average cross-sectional dimension of the notional plane segments aforesaid, experimental means may be used to determine a particular variation in light guide cross-section required to attain a desired uniform or a desired gradient of light escapement through the walls of light guide 10.

In any case, light guide 10 may be enclosed within an external cover (not shown) formed of a material, some portions of which substantially transmit light, and the remaining portions of which substantially reflect light. Accordingly, a portion of the light which is allowed to escape through the walls of light guide 10 is transmitted through the light transmitting portion of the cover and away from light guide 10 for illumination purposes. The remaining portion of the light which escapes through the walls of light guide 10 is reflected, by the light reflecting portions of the cover, back into light guide 10. It will thus be noted that a high degree of controllability may be attained by configuring light guide 10 and the cover so that only a desired amount of light escapes from light guide 10 and the cover and so that the remaining light is not "wasted" but is instead reflected back inside the light guide for continued transmission therealong and potential escapement therefrom at a point further along the guide. Thus, the illumination energy of the light source which illuminates light guide 10 is minimized.

As will be apparent to those skilled in the art, in light of the foregoing disclosure, many alterations and modifications are possible in the practice of this invention without departing from the spirit or scope thereof. Accordingly, the scope of the invention is to be construed in accordance with the substance defined by the following claims.

I claim:

1. A light guide, having:
   (i) a central path comprising the locus of points which are the centroids of the segments contained within said light guide of all planes which intersect said light guide and which are oriented such that the area of each of said plane segments is a minimum; and,
   (iii) an average cross-sectional dimension comprising, for each one of said plane segments, the average length of those portions of all lines within said light guide which lie on said one plane segment and which intersect said light guide;
   wherein:
   (a) the length of said light guide is substantially greater than the average cross-sectional dimension of substantially all of said plane segments;
   (b) the fractional rate of change, along said light guide, of substantially all randomly selected cross-sectional dimensions of said light guide, is substantially less than the reciprocal of the average cross-sectional dimension of substantially all of said plane segments;
   (c) the radius of curvature of said central path at substantially all randomly selected points on said central path is substantially greater than the average cross-sectional dimension of substantially all of said plane segments; and,
   (d) said light guide contains a mechanism which causes light to escape from said light guide at a rate which varies along the length of said light guide, such that the mount of light escaping, per unit length, along said light guide has a selected distribution of values, wherein:
   (I) said mechanism is a substantially non light absorptive material; and,
   (II) the density of said material varies as a function of the length of said light guide.

2. A light guide, as defined in claim 1, wherein said central path is non linear.

3. A light guide as defined in claim 2, wherein said non linearity is such that light escapes from said light guide at a rate which varies as a function of the length of said light guide.

4. A light guide as defined in claim 3, wherein the amount of light escaping, per unit length, from said light guide is substantially constant along the length of said light guide.

5. A light guide as defined in claim 2, 3 or 4, further comprising an external cover over at least a portion of said light guide, whereby:
   (a) a portion of the light which escapes from said light guide is transmitted through said cover and away from said light guide; and,
   (b) the remaining portion of said escaping light is reflected by said cover back into said light guide.

6. A light guide, as defined in claim 1, wherein the average cross-sectional dimension of each of said plane segments is non constant.

7. A light guide as defined in claim 6, wherein said the average cross-sectional dimension of each of said plane segments varies such that light escapes from said light guide at a rate which varies as a function of the length of said light guide.

8. A light guide as defined in claim 7, wherein the amount of light escaping, per unit length, from said light guide is substantially constant along the length of said light guide.

9. A light guide as defined in claim 6, 7 or 8, further comprising an external cover over at least a portion of said light guide, whereby:
   (a) a portion of the light which escapes from said light guide is transmitted through said cover and away from said light guide; and,
   (b) the remaining portion of said escaping light is reflected by said cover back into said light guide.

10. A light guide as defined in claim 1, wherein:
    (a) a first portion of said light guide comprises prism light guide material; and,
    (e) the remaining portion of said light guide allows a substantial portion of light incident thereupon to escape therethrough.

11. A light guide as defined in claim 10, wherein the ratio of said first and remaining portions varies, along said light guide, such that a substantially constant amount of light escapes through said remaining portion at all points along said light guide.

12. A light guide as defined in claim 10 or 11, further comprising an external cover over at least a portion of said light guide, whereby:
    (a) a portion of the light which escapes from said remaining portion is transmitted through said cover and away from said light guide; and,
    (b) the remaining portion of said escaping light is reflected by said cover back into said light guide.

13. A light guide as defined in claim 11, wherein said remaining portion is formed by removing a selected amount of prism light guide material from a selected portion of said light guide.

14. A light guide as defined in claim 11, wherein said remaining portion is formed by altering the optical characteristics of a selected part of the prism light guide material initially forming part of said first portion to prevent specular total internal reflection of light within said light guide from occurring at said selected part.

15. A light guide as defined in claim 11, wherein said remaining portion is formed by placing in optical contact with a selected part of the prism light guide material initially forming part of said first portion, a substance which prevents specular total internal reflection of light within said light guide from occurring.

16. A light guide, having:
   (i) a central path comprising as the locus of points which are the centroids of the segments contained within said light guide of all planes which intersect said light guide and which are oriented such that the area of each of said plane segments is a minimum; and,
   (ii) an average cross-sectional dimension comprising, for each one of said plane segments, the average length of those portions of all lines within said light guide which lie on said one plane segment and which intersect said light guide;
   wherein:
   (a) the length of said light guide is substantially greater than the average cross-sectional dimension of substantially all of said plane segments;
   (b) the fractional rate of change, along said light guide, of substantially all randomly selected cross-sectional dimensions of said light guide, is substantially less than the reciprocal of the average cross-sectional dimension of substantially all of said plane segments;
   (c) the radius of curvature of said central path at substantially all randomly selected points on said central path is substantially greater than the average cross-sectional dimension of substantially all of said plane segments; and
   (d) said light guide contains a mechanism which causes light to escape from said light guide at a rate which varies along the length of said light guide, such that the amount of light escaping, per unit length, along said light guide has a selected distribution of values,
   and further comprising
   an external cover over at least a portion of said light guide, whereby:
   (a) a portion of the light which escapes from said light guide is transmitted through said cover and away from said light guide; and
   (b) the remaining portion of said escaping light is reflected by said cover back into said light guide.

17. A light guide, having:
   (i) a central path comprising the locus of points which are the centroids of the segments contained within said light guide of all planes which intersect said light guide and which are oriented such that the area of each of said plane segments is a minimum; and,
   (ii) an average cross-sectional dimension comprising, for each one of said plane segments, the average length of those portions of all lines within said light guide which lie on said one plane segment and which intersect said light guide;
   wherein:
   (a) the length of said light guide is substantially greater than the average cross-sectional dimension of substantially all of said plane segments;
   (b) the fractional rate of change, along said light guide, of substantially all randomly selected cross-sectional dimensions of said light guide, is substantially less than the reciprocal of the average cross-sectional dimension of substantially all of said plane segments;
   (c) the radius of curvature of said central path at substantially all randomly selected points on said central path is substantially greater than the average cross-sectional dimension of substantially all of said plane segments; and,
   (d) said central path is non linear.

18. A light guide as defined in claim 17, wherein said non linearity is such that light escapes from said light guide at a rate which varies as a function of the length of said light guide.

19. A light guide as defined in claim 18, wherein the amount of light escaping, per unit length, from said light guide is substantially constant along the length of said light guide.

20. A light guide as defined in claim 17, 18 or 19, further comprising an external cover over at least a portion of said light guide, whereby:
   (a) a portion of the light which escapes from said light guide is transmitted through said cover and away from said light guide; and,
   (b) the remaining portion of said escaping light is reflected by said cover back into said light guide.

21. A light guide, as defined in claim 17, wherein the average cross-sectional dimension of each of said plane segments is non constant.

22. A light guide as defined in claim 21, wherein said the average cross-sectional dimension of each of said plane segments varies such that light escapes from said light guide at a rate which varies as a function of the length of said light guide.

23. A light guide as defined in claim 22, wherein the amount of light escaping, per unit length, from said light guide is substantially constant along the length of said light guide.

24. A light guide as defined in claim 21, 22 or 23, further comprising an external cover over at least a portion of said light guide, whereby:
   (a) a portion of the light which escapes from said light guide is transmitted through said cover and away from said light guide; and,
   (b) the remaining portion of said escaping light is reflected by said cover back into said light guide.

25. A light guide as defined in claim 17,
   (a) wherein a first portion of said light guide comprises prism light guide material; and,
   (e) the remaining portion of said light guide allows a substantial portion of light incident thereupon to escape therethrough.

26. A light guide as defined in claim 25, wherein the ratio of said first and remaining portions varies, along said light guide, such that a substantially constant amount of light escapes through said remaining portion at all points along said light guide.

27. A light guide as defined in claim 25 or 26, further comprising an external cover over at least a portion of said light guide, whereby:
   (a) a portion of the light which escapes from said remaining portion is transmitted through said cover and away from said light guide; and, (b) the remaining portion of said escaping light is reflected by said cover back into said light guide.

28. A light guide as defined in claim 26, wherein said remaining portion is formed by removing a selected amount of prism light guide material from a selected portion of said light guide.

29. A light guide as defined in claim 26, wherein said remaining portion is formed by altering the optical characteristics of a selected part of the prism light guide material initially forming part of said first portion to prevent specular total internal reflection of light within said light guide from occurring at said selected part.

30. A light guide as defined in claim 26, wherein said remaining portion is formed by placing in optical contact with a selected part of the prism light guide material initially forming part of said first portion, a substance which prevents specular total internal reflection of light within said light guide from occurring.

31. A light guide, having:
(i) a central path comprising the locus of points which are the centroids of the segments contained within said light guide of all planes which intersect said light guide and which are oriented such that the area of each of said plane segments is a minimum; and,
(ii) an average cross-sectional dimension comprising, for each one of said plane segments, the average length of those portions of all lines within said light guide which lie on said one plane segment and which intersect said light guide;
wherein:
(a) the length of said light guide is substantially greater than the average cross-sectional dimension of substantially all of said plane segments;
(b) the fractional rate of change, along said light guide, of substantially all randomly selected cross-sectional dimensions of said light guide, is substantially less than the reciprocal of the average cross-sectional dimension of substantially all of said plane segments;
(c) the radius of curvature of said central path at substantially all randomly selected points on said central path is substantially greater than the average cross-sectional dimension of substantially all of said plane segments; and,
(d) the average cross-sectional dimension of each of said plane segments is non constant.

32. A light guide as defined in claim 31, wherein said the average cross-sectional dimension of each of said plane segments varies such that light escapes from said light guide at a rate which varies as a function of the length of said light guide.

33. A light guide as defined in claim 32, wherein the amount of light escaping, per unit length, from said light guide is substantially constant along the length of said light guide.

34. A light guide as defined in claim 31, 32 or 33, further comprising an external cover over at least a portion of said light guide, whereby:
(a) a portion of the light which escapes from said light guide is transmitted through said cover and away from said light guide; and,
(b) the remaining portion of said escaping light is reflected by said cover back into said light guide.

35. A light guide as defined in claim 31, wherein:
(a) a first portion of said light guide comprises prism light guide material; and,
(e) the remaining portion of said light guide allows a substantial portion of light incident thereupon to escape therethrough.

36. A light guide as defined in claim 35, wherein the ratio of said first and remaining portions varies, along said light guide, such that a substantially constant amount of light escapes through said remaining portion at all points along said light guide.

37. A light guide as defined in claim 35 or 36, further comprising an external cover over at least a portion of said light guide, whereby:
(a) a portion of the light which escapes from said remaining portion is transmitted through said cover and away from said light guide; and,
(b) the remaining portion of said escaping light is reflected by said cover back into said light guide.

38. A light guide as defined in claim 36, wherein said remaining portion is formed by removing a selected amount of prism light guide material from a selected portion of said light guide.

39. A light guide as defined in claim 36, wherein said remaining portion is formed by altering the optical characteristics of a selected part of the prism light guide material initially forming part of said first portion to prevent specular total internal reflection of light within said light guide from occurring at said selected part.

40. A light guide as defined in claim 36, wherein said remaining portion is formed by placing in optical contact with a selected part of the prism light guide material initially forming part of said first portion, a substance which prevents specular total internal reflection of light within said light guide from occurring.

41. A light guide, having:
(i) a central path comprising the locus of points which are the centroids of the segments contained within said light guide of all planes which intersect said light guide and which are oriented such that the area of each of said plane segments is a minimum; and,
(ii) an average cross-sectional dimension comprising, for each one of said plane segments, the average length of those portions of all lines within said light guide which lie on said one plane segment and which intersect said light guide;
wherein:
(a) the length of said light guide is substantially greater than the average cross-sectional dimension of substantially all of said plane segments;
(b) the fractional rate of change, along said light guide, of substantially all randomly selected cross-sectional dimensions of said light guide, is substantially less than the reciprocal of the average cross-sectional dimension of substantially all of said plane segments;
(c) the radius of curvature of said central path at substantially all randomly selected points on said central path is substantially greater than the average cross-sectional dimension of substantially all of said plane segments;
(d) a first portion of said light guide comprises prism light guide material; and,
(e) the remaining portion of said light guide allows a substantial portion of light incident thereupon to escape therethrough.

42. A light guide as defined in claim 41, wherein the ratio of said first and remaining portions varies, along said light guide, such that a substantially constant amount of light escapes through said remaining portion at all points along said light guide.

43. A light guide as defined in claim 41 or 42, further comprising an external cover over at least a portion of said light guide, whereby:
   (a) a portion of the light which escapes from said remaining portion is transmitted through said cover and away from said light guide; and,
   (b) the remaining portion of said escaping light is reflected by said cover back into said light guide.

44. A light guide as defined in claim 42, wherein said remaining portion is formed by removing a selected amount of prism light guide material from a selected portion of said light guide.

45. A light guide as defined in claim 42, wherein said remaining portion is formed by altering the optical characteristics of a selected part of the prism light guide material in initially forming part of said first portion to prevent specular total internal reflection of light within said light guide from occurring at said selected part.

46. A light guide as defined in claim 42, wherein said remaining portion is formed by placing in optical contact with a selected part of the prism light guide material initially forming part of said first portion, a substance which prevents specular total internal reflection of light within said light guide from occurring.

* * * * *